US006827331B1

(12) United States Patent
Roos

(10) Patent No.: US 6,827,331 B1
(45) Date of Patent: Dec. 7, 2004

(54) ELECTROMAGNETIC ACTUATOR

(75) Inventor: Gerald Roos, Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 09/868,150

(22) PCT Filed: Oct. 28, 2000

(86) PCT No.: PCT/DE00/03816

§ 371 (c)(1), (2), (4) Date: Jun. 15, 2001

(87) PCT Pub. No.: WO01/34949

PCT Pub. Date: May 17, 2001

(30) Foreign Application Priority Data

Nov. 9, 1999 (DE) ........................................ 199 53 788

(51) Int. Cl.[7] ................................................ F16K 31/02

(52) U.S. Cl. ............................ 251/129.15; 251/129.16; 335/228

(58) Field of Search ....................... 251/129.15, 129.16; 335/228, 251, 220, 227

(56) References Cited

U.S. PATENT DOCUMENTS 4,281,685 A * 8/1981 Uemura ...................... 137/628
4,403,765 A * 9/1983 Fisher ......................... 251/65
4,633,209 A * 12/1986 Belbel et al. ............... 335/261
4,658,231 A * 4/1987 Schwenzer et al. ......... 335/261
5,139,224 A * 8/1992 Bright ......................... 251/50
5,402,093 A * 3/1995 Gibas et al. ................ 335/261
5,627,504 A * 5/1997 Kleinhappl ................. 335/230
5,687,698 A * 11/1997 Mastro et al. .............. 123/571
5,715,704 A * 2/1998 Cholkeri et al. .............. 62/257
5,752,308 A * 5/1998 Maley et al. .............. 29/602.1
5,779,220 A * 7/1998 Nehl et al. ............. 251/129.15
5,878,779 A * 3/1999 Bircann et al. ............. 137/554
5,947,092 A * 9/1999 Hussey et al. ......... 123/568.26
6,037,851 A * 3/2000 Gramann et al. ........... 335/228
6,062,536 A * 5/2000 Bircann ................. 251/129.15
6,152,422 A * 11/2000 Staib et al. ............ 251/129.15
6,265,957 B1 * 7/2001 Baginski et al. ............ 335/266
6,373,363 B1 * 4/2002 Spakowski et al. ......... 335/256

FOREIGN PATENT DOCUMENTS

| | | | |
|---|---|---|---|
| DE | 44 16 858 | A | 11/1995 |
| DE | 1908 04 225 | C | 5/1999 |
| DE | 198 41 499 | A | 3/2000 |
| EP | 0 296 983 | A | 12/1988 |
| EP | 0 870 906 | A | 10/1998 |

* cited by examiner

*Primary Examiner*—Gene Mancene
*Assistant Examiner*—Frederick C. Nicolas
(74) *Attorney, Agent, or Firm*—Michael J. Striker

(57) ABSTRACT

The invention is based on an electromagnetic actuator, especially for activating a valve, having at least one electromagnet (10) that acts on a correspondingly designed armature surface (20) of a moveable armature (22) in a first effective range (12) by way of at least one first conical and/or stepped pole face (18) using a magnetic field (16) generated by at least one coil (14).

Figure 1:
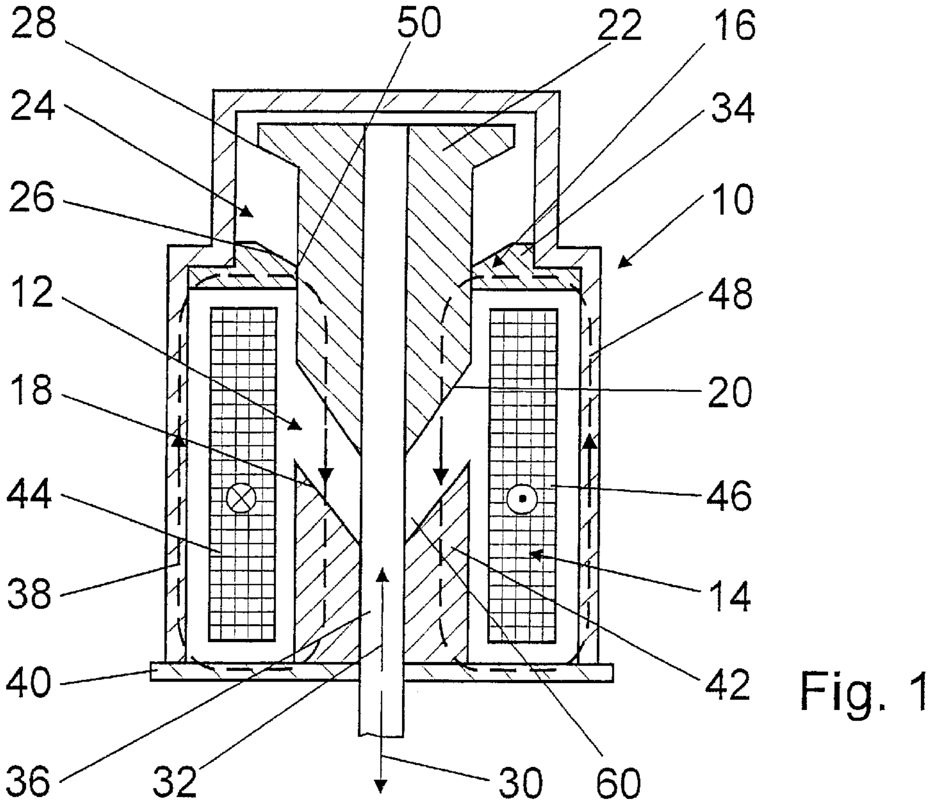

It is proposed that the electromagnet (10) act on a corresponding armature surface (28) by way of at least a second pole face (26) in at least a second effective range (24).

5 Claims, 2 Drawing Sheets

ELECTROMAGNETIC ACTUATOR

BACKGROUND INFORMATION

The invention is based on an electromagnetic actuator according to the preamble of claim 1.

Known electromagnetic actuators for activating a valve usually include an electromagnet which acts on a correspondingly designed armature surface of a moveable armature by way of at least one pole face in an effective range using a magnetic field generated by a coil. When the actuator is activated, the armature is drawn out of a starting position with the armature surface in the direction of the pole face, and the valve is opened or closed directly by the armature or indirectly by way of an armature plunger, and, in fact, usually against spring resistance. In an end position, the armature surface lies on the pole face.

In order to enable the electromagnet to act on the armature along a long stroke and, as a result, to make a long travel distance possible, it is known to design the pole face and the corresponding armature surface to be conical and/or stepped. Using high steps or a steep taper, a short, direct path between the pole face and the armature surface can be achieved despite a long travel distance in the starting position and from the start of the correcting movement onward and, as a result, a relatively strong force on the armature can be achieved from the beginning onward. Compared to a pole face which is situated basically perpendicular to the travel distance, however, a smaller force is achieved immediately before and in the final position.

ADVANTAGES OF THE INVENTION

The invention is based on an electromagnetic actuator, especially for activating a valve, having at least one electromagnet that acts on a correspondingly designed armature surface of a moveable armature by way of at least one first conical and/or stepped pole face in a first effective range using a magnetic field generated by at least one coil.

It is proposed that the electromagnet act on a corresponding armature surface by way of at least a second pole face in at least a second effective range. A long travel distance having a relatively strong force from the start of the travel distance onward can be achieved advantageously with the first effective range using a first pole face having a steep taper or high steps. Additionally, a strong force can be achieved in the final position with the second effective range, especially using a second pole face situated basically perpendicular to the direction of movement.

Especially advantageously, the conical and/or stepped first pole face is situated at least partially within the coil, advantageously completely inside the coil. The radial and axial space inside the coil can be used advantageously and additional space can be saved.

Furthermore, space can be saved by situating the second pole face in the direction of movement of the armature between the armature and the coil. In order to achieve the greatest possible force in the end position using the second pole face, it is advantageously designed basically perpendicular to the direction of movement of the armature and thereby requires only small axial space. An especially large part of the cross-sectional area of the coil can be used as pole face and a small actuator with strong force can be achieved. Moreover, it is possible to arrange the first, second or a third pole face radially outside the coil that acts on a corresponding armature surface.

The radial inner region of the second pole face can be used advantageously to safely guide the armature in the direction of movement in two places separated by a large distance.

In a design of the invention it is proposed that a component forming the second pole face be designed as a single piece with a guide of the armature. A favorable magnetic flux can be achieved and additional components, space, and assembly expenditure can be saved. Moreover, an especially large second pole face can be achieved on small space. The guide can also be formed out of an additional component having special sliding properties, however.

The solution according to the invention can be used in various electromagnetic actuators that appear appropriate to the expert, especially advantageously however in electromagnetic actuators for activating a valve that require a long travel distance on small space and the greatest possible force in the end position, for example in a solenoid valve for a water circuit, etc.

DRAWING

Further advantages are presented in the following description of the drawing. The drawing shows a design example of the invention. The drawing, the description, and the claims contain numerous features in combination. It is appropriate for the expert to also examine the features individually and combine them into additional logical combinations.

Figure 2:
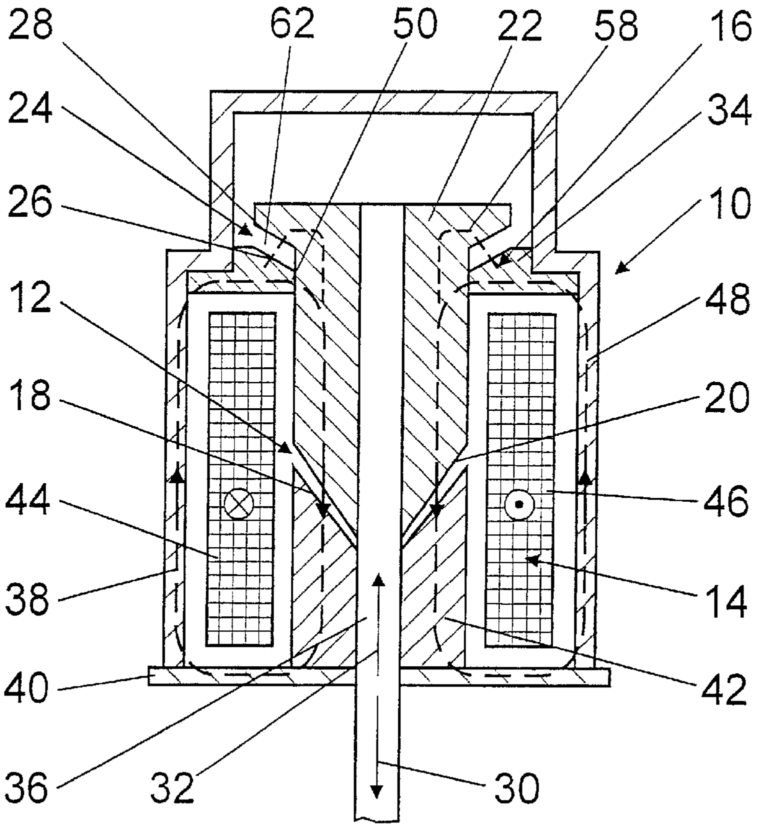
Figure 3:
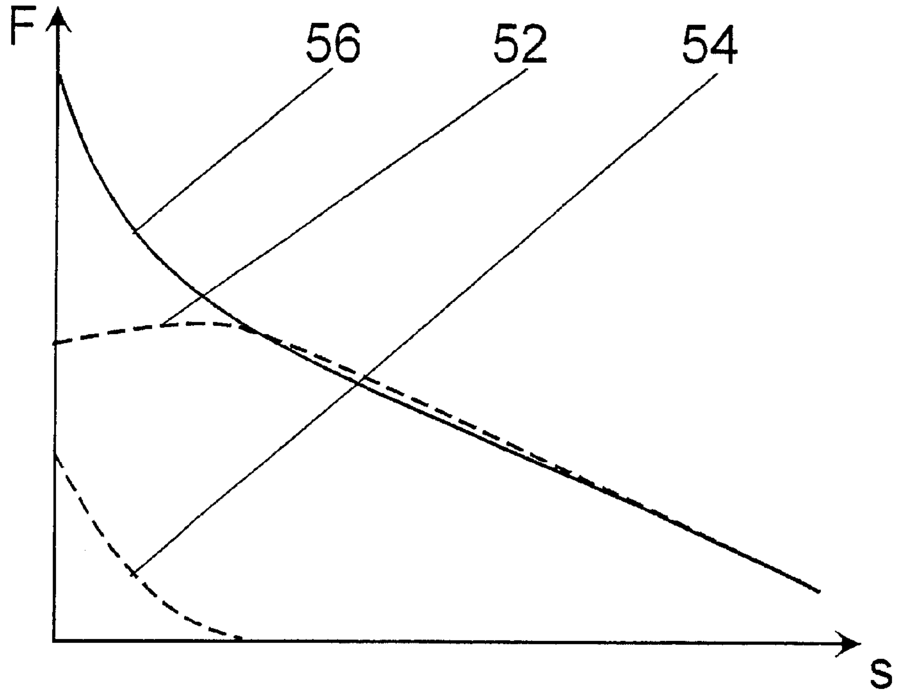

FIG. 1 shows a section of an actuator in cross-section in a starting position, FIG. 2 shows an actuator according to FIG. 1 shortly before an end position, and FIG. 3 shows a force-stroke diagram.

DESCRIPTION OF THE DESIGN EXAMPLE

FIG. 1 shows an electromagnetic actuator for activating a not further presented valve having an electromagnet 10. The electromagnet 10 acts on a correspondingly designed armature surface 20 of an armature 22 that is moveable in direction 30, 32 by way of a first conical pole face 18 in a first effective range 12 using magnetic field 16 generated by a coil 14. Armature 22 is connected with a not further presented valve spool by means of an armature plunger 36.

According to the invention, the electromagnet 10 acts on a corresponding armature surface 28 of the armature 22 by way of a second pole face 26 in a second effective range 24. The first pole face 18 is situated inside the coil 14 and the second pole face 26 is situated in the direction of movement 30, 32 of the armature 22 between the armature 22 and the coil 14. The radial and axial space inside the coil 14 is used for the first pole face 18 having a steep taper, and the space in the direction of movement 30, 32 of the armature between the coil 14 and the armature 22 is used for the second pole face 26, which has a flat taper.

The second pole face 26 is formed by a component 34 that is attached to a field frame 38. The field frame 38 is closed by a cover 40 to which a coil core 42 is attached, which forms the first pole face 18. The armature 22 is moved by way of its armature plunger 36 in the coil core 42 and directly in a guide surface 50 in the component 54.

If the electromagnet 10 is activated and current flows to the coil 14, and, in fact, a coil current that enters the plane of projection on the coil side 44 and exits the plane of projection on the coil side 46, a magnetic flux 48 is produced. The magnetic flux 48 flows through the cover 40, the field frame 38, the component 34, the guide surface 50, the armature 22, the armature surface 20, a working air gap 60, the first pole face 18 and over the coil core 42 to the cover 40.

The first pole face 18 and the corresponding armature surface 20 are separated by a relatively small direct distance in the starting position due to the steep taper, as a result of which a relatively strong force acts on the armature 22 from the start of the travel distance onward. A long travel distance is made possible. A force-stroke diagram is presented in FIG. 3, in which a force-stroke characteristic curve 52 is presented isolated from the first effective range 12. The stroke s is plotted on the abscissa and the power F is plotted on the ordinate.

If the magnetic flux 48 increases and saturation occurs on the guide surface 50, an additional magnetic flux 58 arises from component 34 by way of the second pole face 26, over a second working air gap 62 and through the armature surface 28 to the armature 22 (FIG. 2). The second pole face 26 and the corresponding armature surface 28 each have a flat taper and are designed basically perpendicular to the direction of movement 30, 32 of the armature 22. The electromagnet 10 does not act on the corresponding armature surface 28 by way of the second pole face 26 until shortly before the end position, although with a relatively strong force, as shown in FIG. 3 with a force-stroke characteristic curve 54 isolated for the second effective range 24.

Using the combination according to the invention of the two effective ranges 12, 24, an advantageous force-stroke characteristic curve 56 having a relatively strong force in the starting position and a strong force in the end position is achieved.

REFERENCE SYMBOLS

10 Electromagnet
12 Effective range
14 Coil
16 Magnetic field
18 Pole face
20 Armature surface
22 Armature
24 Effective range
26 Pole face
28 Armature surface
30 Direction
32 Direction
34 Component
36 Armature plunger
38 Field frame
40 Cover
42 Coil core
44 Coil side
46 Coil side
48 Magnetic flux
50 Guide surface
52 Force-stroke characteristic curve
54 Force-stroke characteristic curve
56 Force-stroke characteristic curve
58 Magnetic flux
60 Working air gap
62 Working air gap
F Force
s Stroke

What is claimed is:

1. Electromagnetic actuator, having at least one electromagnet (10) that acts on a correspondingly designed armature surface (20) of a moveable armature (22) in a first effective range (12) by way of at least one first conical and/or stepped pole face (18) using a magnetic field (16) generated by at least one coil (14), thereby forming a first magnetic flux (48), wherein said first magnetic flux (48) flows through a first working air gap (60), characterized in that, shortly before the moveable armature (22) reaches an end position, the electromagnet (10) acts on a corresponding armature surface (28) by way of at least a second pole face (26) in at least a second effective range (24), whereby a second magnetic flux (58) is formed, wherein said second magnetic flux (58) flows through a second working air gap (62), wherein a component (34) forming the second pole face (26) is formed as a single piece with a guide of the armature (22).

2. Electromagnetic actuator according to claim 1, wherein the second pole face (26) is situated substantially perpendicular to the direction of movement (30, 32) of the armature (22).

3. Electromagnetic actuator according to claim 1, wherein the first, conical and/or stepped pole face (18) is situated at least partially within the coil (14).

4. Electromagnetic actuator according to claim 1, wherein the second pole face (25) is situated between an upper end of an armature plunger and the coil (14) in the direction of movement (30, 32) of the armature (22).

5. Electromagnetic actuator, having at least one electromagnet (10) that acts on a correspondingly designed armature surface (20) of a moveable armature (22) in a first effective range (12) by way of at least one first conical and/or stepped pole face (18) using a magnetic field (16) generated by at least one coil (14), thereby forming a first magnetic flux (48), wherein said first magnetic flux (48) flows through a first working air gap (60), characterized in that, shortly before the moveable armature (22) reaches an end position, the electromagnet (10) acts on a corresponding armature surface (28) by way of at least a second pole face (26) in at least a second effective range (24), whereby a second magnetic flux (58) is formed, wherein said second magnetic flux (58) flows through a second working air gap (62), wherein said second pole face (26) is situated between an upper end of an armature plunger and the coil (14) in the direction of movement (30, 32) of the armature (22), wherein the armature (22) is moved through a guide in the direction of movement (30, 32) in a radial inner region of the second pole direction (26).

* * * * *